(12) United States Patent
Hutchinson

(10) Patent No.: US 7,503,315 B2
(45) Date of Patent: Mar. 17, 2009

(54) METHOD FOR CONTROLLING THE FUEL SYSTEM FOR AN INTERNAL COMBUSTION ENGINE

(76) Inventor: Paul John Hutchinson, 127 Blackmoor Gate, Furzton, Milton Keynes MK4 1DJ (GB)

( * ) Notice: Subject to any disclaimer, the term of this patent is extended or adjusted under 35 U.S.C. 154(b) by 0 days.

(21) Appl. No.: 11/796,048

(22) Filed: Apr. 26, 2007

(65) Prior Publication Data
US 2007/0221180 A1    Sep. 27, 2007

Related U.S. Application Data

(63) Continuation of application No. PCT/GB2005/004132, filed on Oct. 27, 2005.

(30) Foreign Application Priority Data
Oct. 28, 2004  (GB) ................................ 0423945.5

(51) Int. Cl.
*F02M 21/02*  (2006.01)
*F02G 5/00*   (2006.01)
(52) U.S. Cl. .................. 123/525; 123/27 GE; 123/557
(58) Field of Classification Search ............. 123/27 GE, 123/525, 526, 557
See application file for complete search history.

(56) References Cited

U.S. PATENT DOCUMENTS

| 3,406,666 | A | * | 10/1968 | Anton Steiger | ......... 123/27 GE |
| 4,411,243 | A | * | 10/1983 | Hardenberg et al. | ......... 123/525 |
| 4,421,087 | A | * | 12/1983 | Schuurman | .................. 123/525 |
| 4,522,158 | A | * | 6/1985 | Wisegerber | .................. 123/525 |
| 4,641,625 | A | * | 2/1987 | Smith | ..................... 123/27 GE |
| 6,655,130 | B1 | * | 12/2003 | Kirwan et al. | .................. 60/284 |
| 2004/0089277 | A1 | * | 5/2004 | Shetley et al. | ................ 123/557 |

FOREIGN PATENT DOCUMENTS

| FR | 2 768 184 | | 3/1999 |
| GB | 2248087 A | * | 3/1992 |
| JP | 59 192858 | | 3/1985 |
| JP | 03 266173 | | 3/1992 |

OTHER PUBLICATIONS

International Search Report PCT/GB2005/004132.

* cited by examiner

*Primary Examiner*—Noah Kamen

(57) ABSTRACT

A method of controlling the power of an internal combustion engine (1) comprising the following steps; in a first, lower power phase of operation of the engine (1), supplying a mixture of air (8) and fuel to the combustion chamber. The majority of the fuel is supplied as fuel vapour. The power output of the engine (1) is increased by progressively opening a combustion air control means to increase the volume of air (8) supplied to the combustion chamber and at the same time progressively increasing the volume of fuel supplied. In a second, higher power phase of operation of the engine (1) the combustion air control means is maintained in a substantially constant state, the power output of the engine (1) being increased by supplying an increasing volume of liquid fuel to the combustion chamber and at the same time reducing the volume of fuel vapour supplied such that, at maximum power substantially all the fuel is supplied in liquid state.

12 Claims, 1 Drawing Sheet

METHOD FOR CONTROLLING THE FUEL SYSTEM FOR AN INTERNAL COMBUSTION ENGINE

CROSS-REFERENCE TO RELATED APPLICATIONS

Figure 1:
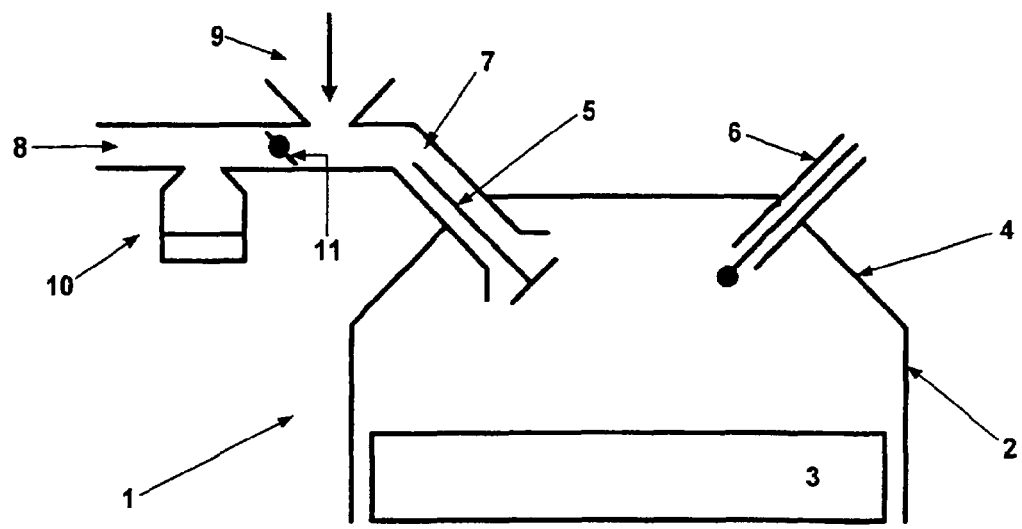

This application is a continuation of PCT Patent Application No. PCT/GB2005/004132 filed on Oct. 27, 2005, which claims the benefit of GB 0423945.5, filed Oct. 28, 2004. The disclosures of the above applications are incorporated herein by reference.

FIELD

The present disclosure relates to a fuel system for an internal combustion engine, and in particular a fuel system which results in improved economy and/or improved specific power output, which is applicable to both spark ignition (Otto) engines and compression ignition (diesel) engines.

BACKGROUND

The statements in this section merely provide background information related to the present disclosure and may not constitute prior art.

A gasoline engine works by drawing into its cylinder a mixture of air and fuel which is compressed, then ignited to burn and thus generate power. Known devices, such as those disclosed in JP 03286173, U.S. Pat. No. 5,273,020 and GB2248087, are comprised of the apparatus as herein described, however, the novel method of their control is the basis of this invention.

In the past the fuel air mixture was provided by a carburetor. Now the fuel system is usually electronically controlled and has one or more injectors which deliver fuel to the manifold and/or cylinder. JP 03286173 is considered the closest prior art and discloses the use of a fuel vapour restriction means to reduce the supply of fuel vapour when the demand for power is high and the air-fuel ratio is determined to be at or above a threshold level—thus attempting to optimize the air-fuel ratio and improve the efficiency of the engine.

A gasoline engine works by drawing into its cylinder a mixture of air and fuel which is compressed, then ignited to burn and thus generate power.

In the past the fuel air mixture was provided by a carburettor. Now the fuel system is usually electronically controlled and has one or more injectors which deliver fuel to the manifold and/or cylinder.

It is essential that at the time of ignition a burnable mixture is present in the cylinder near the igniter. As a result the mixture must be controlled to be within ignitable limits. Consequently the volume of air ingested by the engine must be matched to the fuel volume. This is achieved by a throttle valve which limits the intake of air.

The size of engine fitted to almost all cars is such that full power is rarely used and, in particular, in urban traffic the engine is usually operating at a small fraction of its maximum power outlet. Thus the engine is generally operating with the throttle valve partly closed. Consequently the engine suffers significant pumping losses as the air is drawn past this obstruction. This loss is the reason that Otto engines are less economic of fuel than Diesel engines in urban traffic. If this loss could be eliminated Otto engines economy would rise to be close to that of a diesel engine of similar power.

In the past there have been attempts to reduce this loss by supplying the gasoline in vapour form rather than as a liquid. The increased volume of flow then allowed the throttle to be opened wider thus reducing the pumping loss and improving economy. However, supplying the fuel as vapour also limits the maximum amount that can be drawn into the cylinder and hence the maximum power. The economy achieved by fitting a vapouriser to an engine of any given size turns out to be approximately the same as that achieved by fitting a smaller conventionally fuelled engine which has the same maximum power. Consequently vapourisers have been abandoned as economy devices.

SUMMARY

In accordance with the present invention there is provided a method of controlling the power of an internal combustion engine comprising the steps of; in a first, lower power phase of operation of the engine, supplying a mixture of air and fuel to the combustion chamber, a majority of the fuel being supplied as fuel vapour, the power output of the engine being increased by progressively opening a combustion air control means to increase the volume of air supplied to the combustion chamber and at the same time progressively increasing the volume of fuel supplied; and characterised by: in a second, higher power phase of operation of the engine, maintaining the combustion air control means in a substantially constant state, the power output of the engine being increased by supplying an increasing volume of liquid fuel to the combustion chamber and at the same time reducing the volume of fuel vapour supplied such that, at maximum power substantially all the fuel is supplied in liquid state.

The essence of the new idea is to disclose a method of operating a vapouriser combined with a conventional fuelling system to provide an Otto engine having economy close to that of a diesel while maintaining the Otto engine maximum power output.

Preferably, the combustion air control means is a throttle valve, whilst the substantially constant state of the combustion air control means is a fully open position. At low power all, or most, of the fuel would be supplied as vapour allowing the throttle to be opened more widely than for a conventionally fuelled engine. As the demand for power increases the throttle valve is progressively opened until full throttle is reached. Advantageously, said step of supplying fuel vapour comprises supplying fuel vapour through a vaporizer and said step of supplying liquid fuel through a fuel injector. When more power is required the throttle is maintained fully open, and the supply of vapour is restricted, allowing more air to enter the manifold and liquid fuel is supplied in the manifold. This switch from vapour to liquid fuel continues progressively until at maximum power the intake through the throttle is only air and the fuel is supplied entirely as liquid. As a result the throttle is open as wide or wider than that of a conventionally fuelled engine at all times in the cycle and the maximum available power remains the same as in a conventionally fuelled engine. The device could be retro fitted to existing vehicles or incorporated into new designs and preferably the liquid fuel is supplied directly to the combustion chamber. Advantageously, said step of supplying liquid fuel comprises injecting liquid fuel into the inlet manifold and/or directly into the combustion chamber downstream of the combustion air control means.

Instead of using the vaporiser entirely for improved economy it could also be set up for increased power. When liquid fuel is supplied not all of it is burned as a result of poor vaporisation and mixing. Supplying vapour in addition to liquid fuel at maximum throttle opening would enhance maximum power providing it only displaced air that would not otherwise react with fuel. Advantageously, during a third power phase, which occurs after the second higher power phase of operation of the engine, additional fuel vapour is supplied with the liquid fuel such that the fuel vapour only displaces air that would not otherwise react with the fuel, resulting in a greater achievable maximum power. Preferably, the engine is an Otto engine and the combustion air control means is located in an inlet manifold downstream of a source of fuel vapour. In a further preferred embodiment of the invention the engine is a diesel engine. In a conventional diesel engine air is admitted to the inlet manifold without a throttle valve, and an appropriate amount of fuel is injected into the hot air in the cylinder after it has been compressed. The fuel quantity and injection pattern is tailored to self ignite the fuel as it mixes with the hot air. As a result such engines do not suffer from throttle pumping losses. However, the compression required to heat the air adequately for self-ignition imposes significant friction losses.

The maximum power output of a diesel engine is limited by smoke formation as the hydrogen in the fuel rapidly burns leaving behind the less reactive carbon in the fuel. This occurs in part as result of the poor fuel air mixing which is intrinsic to the diesel design as the fuel and air do not have long to mix following injection.

A vaporiser could be used to supply additional pre vapourised fuel when high power was demanded. The premixed fuel would burn effectively once ignited by the injected fuel. As a result the maximum available power from the same engine would be increased or fuel economy could be improved if a smaller engine with less friction was used for the required duty.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
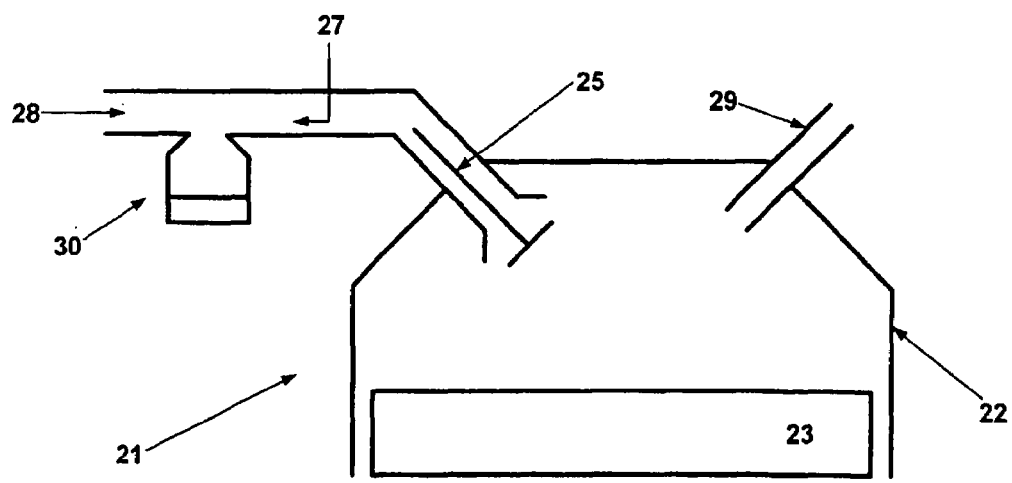

FIG. 1 illustrates schematically a gasoline fuelled Otto engine incorporating an embodiment to the present disclosure; and FIG. 2 illustrates schematically a portion of a compression ignition diesel engine incorporating an embodiment to the present disclosure.

DETAILED DESCRIPTION

The following description is merely exemplary in nature and is not intended to limit the present disclosure, application, or uses.

Referring firstly to FIG. 1 there is shown schematically a portion of an internal combustion engine 1. The portion shown comprises a cylinder 2 in which a piston 3 is mounted for reciprocating movement. The piston 3 is connected, in a conventional manner, by means of a conrod (not shown) to a crankshaft. The cylinder 2 is covered by a cylinder head 4 in which is mounted an inlet valve 5 and one or more exhaust valves (not shown). An ignition device, for example a spark plug, 6 is also mounted in the cylinder head. An inlet manifold 7 supplies a gasoline/air mixture to the inlet valve 5. The air 8 for the gasoline/air mixture is derived from a suitable filtered source and the gasoline is derived from a fuel injector 9 and/or a vaporiser 10 as described in more detail hereinafter. A throttle valve 11 is located in the inlet manifold downstream of the vaporiser 10 and upstream of the injection device 9.

In use, under light to medium load conditions fuel for the fuel /air mixture is provided as vaporised gasoline from the vaporiser 10. Accordingly the mixture which is controlled by the throttle valve 11 is a mixture of air and vaporised gasoline. In order to supply sufficient of this mixture to provide a particular power output from the engine the throttle valve 11 will tend to be wider open than it would be if the fuel fraction of the gasoline/air mixture was supplied by a fuel injector located downstream of the throttle valve.

As demand for power from the engine 1 increases the throttle valve 11 is opened progressively until it is fully open. If, thereafter, addition power is required liquid fuel is injected into the manifold 7 through the injector 9 downstream of the throttle valve. If necessary, in order to provide sufficient air for effective combustion of the additional fuel the output of the vaporiser 10 is reduced thereby allowing the mixture which flows through the throttle valve 11 to have a higher air content. At maximum power output it is envisaged that the vaporiser output will have been reduced to zero or close to zero and that the entire fuel requirement for the gasoline/air mixture will be provided by the injector 9.

The exact phasing of the operation of the vaporiser 10 and injector 9 will be determined by the nature of the power requirements for the engine, the particular operating conditions of the engine, and the design of the inlet manifold. In certain applications it may be desirable to start injecting liquid fuel through the injector 9 before the throttle 11 has reached the wide-open position. Under these circumstances it is possible that the output of the vaporiser may be curtailed before wide-open throttle is reached. The critical thing is that during low power output operation of the engine a significant proportion if not all of the required fuel for the gasoline/air mixture supplied to the engine will be derived from the vaporiser thereby allowing the throttle 11 to operate at a relatively wide open configuration for the engine power output and thereby reducing pumping loss normally associated with throttle valves which control only air admission.

Referring now to FIG. 2 there is shown a portion of a diesel engine 21. The engine 21 includes a cylinder 22 in which a piston 23 is mounted for reciprocating movement in conventional manner. Air 28 for the engine is supplied from a suitable filter to an inlet manifold 27. As is conventional for a diesel engine the manifold 27 does not include a throttle valve. An injector 29 is provided for injecting liquid fuel (typically as a spray of droplets) into the combustion chamber of the engine. An inlet valve 25 controls admission of combustion air to the combustion chamber.

In accordance with the present disclosure the engine 21 is provided with a vaporiser 30 which supplies vaporised fuel to the inlet manifold 27. The amount of fuel supplied by the vaporiser 30 is insufficient to result in spontaneous detonation of the fuel/air mixture which is admitted via the inlet manifold 27 as it is compressed by movement of the piston. Detonation will not be initiated until liquid fuel is injected into the combustion chamber via the injector 29 at or close to the top dead centre position of the piston 23. However, once detonation has been initiated the total burn of the fuel contained in the combustion chamber will be quicker and cleaner than would be the case if all the fuel was supplied through the injector 29. Accordingly, the presence of the vaporiser 30 will result in more effective combustion of fuel at low to medium engine power output. As in the case of the embodiment of FIG. 1, at higher engine outputs the output of the vaporiser 30 will be reduced so that a higher portion of the mixture supplied to the combustion chamber by the inlet manifold 27 is air. At the limit, the vaporiser 30 will be inhibited from omitting any vaporised fuel to the inlet manifold 27 so that pure air will be admitted to the combustion chamber through the inlet valve 25 and the entire fuel requirements of the engine will be met by injection of liquid fuel through the injector 29.

It is to be understood that although the disclosure has been described in the context of a single cylinder, the disclosure will be applicable to multi-cylinder engines and, in particular, will be desirable in the case of engines having a wide range of power output requirements. This situation typically arises in internal combustion engines intended for automobiles. The disclosure is not, however, limited to such applications.

What is claimed is:

1. A method of controlling the power of an internal combustion engine (1) comprising:
    in a first, lower power phase of operation of the engine (1), supplying a mixture of air (8) and fuel to the combustion chamber, a majority of the fuel being supplied as fuel vapour, the power output of the engine (1) being increased by progressively opening a combustion air control means to increase the volume of air (8) supplied to the combustion chamber and at the same time progressively increasing the volume of fuel supplied; and characterised by:
    in a second, higher power phase of operation of the engine (1), maintaining the combustion air control means in a substantially constant state, the power output of the engine (1) being increased by supplying an increasing volume of liquid fuel to the combustion chamber and at the same time reducing the volume of fuel vapour supplied such that, at maximum power of the second higher power phase substantially all the fuel is supplied in liquid state.

2. A method according to claim 1, wherein the combustion air control means is a throttle valve (11).

3. A method according to claim 1, wherein the substantially constant state of the combustion air control means is a fully open position.

4. A method according to claim 1, wherein said step of supplying fuel vapour comprises supplying fuel vapour through a vaporiser (10).

5. A method according to claim 1, wherein said step of supplying liquid fuel comprises supplying liquid fuel through a fuel injector (9).

6. A method according to claim 1, wherein the liquid fuel is supplied directly to the combustion chamber.

7. A method according to claim 1, wherein the engine (1) is an Otto engine and the combustion air control means (11) is located in an inlet manifold (7) downstream of a source of fuel vapour (10).

8. A method according to claim 7, wherein said step of supplying liquid fuel comprises injecting liquid fuel into the inlet manifold (7) and/or directly into the combustion chamber (2) downstream of the combustion air control means (11).

9. A method of controlling the power of an internal combustion engine (1) comprising:
    in a first, lower power phase of operation of the engine (1), supplying a mixture of air (8) and fuel to the combustion chamber, a majority of the fuel being supplied as fuel vapour, the power output of the engine (1) being increased by progressively opening a combustion air control means to increase the volume of air (8) supplied to the combustion chamber and at the same time progressively increasing the volume of fuel supplied; and characterised by:
    in a second, higher power phase of or operation of the engine (1), maintaining the combustion air control means in a substantially constant state, the power output of the engine (1) being increased by supplying an increasing volume of liquid fuel to the combustion chamber and at the same time reducing the volume of fuel vapour supplied such that, at maximum power of the second higher power phase substantially all the fuel is supplied in a liquid state, wherein during a third power phase, which occurs after the second higher power phase of operation of the engine (1), additional fuel vapour is supplied with the liquid fuel such that the fuel vapour only displaces air that would not otherwise react with the fuel, resulting in a greater achievable maximum power.

10. A method of controlling the power of an internal combustion engine (1) comprising:
    in a first, lower power phase of operation of the engine (1), supplying a mixture of air (8) and fuel to the combustion chamber, a majority of the fuel being supplied as fuel vapour, the power output of the engine (1) being increased by progressively opening a combustion air control means to increase the volume of air (8) supplied to the combustion chamber and at the same time progressively increasing the volume of fuel supplied; and characterised by:
    in a second, higher power phase of operation of the engine (1), maintaining the combustion air control means in a substantially constant state, the power output of the engine (1) being increased by supplying an increasing volume of liquid fuel to the combustion chamber and at the same time reducing the volume of fuel vapour supplied such that, at maximum power of the second higher power phase substantially all the fuel is supplied in liquid state, wherein the engine (1) is a diesel engine (21).

11. A method for providing a fuel/air mixture to an internal combustion engine in response to an increasing demand for power from the engine comprising:
    during a state of operation of the internal combustion engine in which the demand for power from the internal combustion engine is low, providing a volume of a first fuel/air mixture to a combustion chamber of the internal combustion engine, wherein the fuel component of the first fuel/air mixture substantially comprises vaporized fuel output from a fuel vaporizer;
    during a state of operation of the internal combustion engine in which the demand for power from the internal combustion engine is increasing from low to moderate, correspondingly increasing the volume of the first fuel/air mixture provided to the combustion chamber by correspondingly increasing the flow capacity of a valve controlling the flow of the first fuel/air mixture to the combustion chamber;
    during a state of operation of the internal combustion engine in which the demand for power from the internal combustion engine is increasing from moderate to high, providing a second fuel/air mixture to the combustion chamber of the internal combustion engine, wherein the fuel component of the second fuel/air mixture comprises vaporized fuel output from the fuel vaporizer and liquid fuel output from a fuel injector; and
    during a state of operation of the internal combustion engine in which the demand for power from the internal combustion engine is increasing from high to maximum, decreasing the ratio of vaporized fuel to liquid fuel in the second fuel/air mixture as the demand for power increases such that, at maximum power, the fuel component of the second fuel/air mixture substantially comprises liquid fuel output from the fuel injector, and the valve is fully opened.

12. A method for providing a fuel/air mixture to an internal combustion engine comprising:
   introducing a first fuel/air mixture to a combustion chamber of the internal combustion engine during operation of the internal combustion engine in which the demand for power from the internal combustion engine is at a first state, wherein the fuel component of the first fuel/air mixture substantially comprises vaporized fuel output from a fuel vaporizer;
   increasing the flow capacity of a valve metering the flow of the first fuel/air mixture to the combustion chamber until the flow capacity of the valve is maximized during operation of the internal combustion engine in which the demand for power from the internal combustion engine is increasing from the first state to a second state;
   introducing a second fuel/air mixture to the combustion chamber of the internal combustion engine during operation of the internal combustion engine in which the demand for power from the internal combustion engine is at a third state, wherein demand for power at the third state is greater than the demand for power at the second state, and wherein the fuel component of the second fuel/air mixture comprises vaporized fuel output from the fuel vaporizer and liquid fuel output from a fuel injector; and
   decreasing the ratio of vaporized fuel to liquid fuel in the second fuel/air mixture during operation of the internal combustion engine in which the demand for power from the internal combustion engine is increasing from the third state to a fourth state, wherein as the demand for power reaches the fourth state, the fuel component of the second fuel/air mixture provided to the combustion chamber of the internal combustion engine substantially comprises liquid fuel output from the fuel injector.

* * * * *